(12) United States Patent
Rawal et al.

(10) Patent No.: US 11,687,535 B2
(45) Date of Patent: Jun. 27, 2023

(54) AUTOMATIC COMPUTATION OF FEATURES FROM A DATA STREAM

(71) Applicant: Elastic Flash Inc., Saratoga, CA (US)

(72) Inventors: Darshan Bharatkumar Rawal, Fremont, CA (US); Naoki Iwakami, Redwood City, CA (US)

(73) Assignee: Elastic Flash Inc., Saratoga, CA (US)

( * ) Notice: Subject to any disclaimer, the term of this patent is extended or adjusted under 35 U.S.C. 154(b) by 400 days.

(21) Appl. No.: 16/918,373

(22) Filed: Jul. 1, 2020

(65) Prior Publication Data

US 2021/0004376 A1 Jan. 7, 2021

Related U.S. Application Data

(60) Provisional application No. 62/869,543, filed on Jul. 1, 2019.

(51) Int. Cl.
| | |
|---|---|
| G06F 16/24 | (2019.01) |
| G06F 16/2455 | (2019.01) |
| G06F 16/242 | (2019.01) |
| G06F 16/22 | (2019.01) |
| G06F 9/48 | (2006.01) |
| G06F 9/50 | (2006.01) |
| G06F 9/451 | (2018.01) |

(52) U.S. Cl.
CPC ........ *G06F 16/24568* (2019.01); *G06F 9/451* (2018.02); *G06F 9/4881* (2013.01); *G06F 9/505* (2013.01); *G06F 16/2219* (2019.01); *G06F 16/244* (2019.01); *G06F 2209/508* (2013.01); *G06F 2209/5022* (2013.01)

(58) Field of Classification Search
CPC ... G06F 16/24568; G06F 9/451; G06F 16/244
See application file for complete search history.

(56) References Cited

U.S. PATENT DOCUMENTS

| | | | | |
|---|---|---|---|---|
| 2013/0262035 A1* | 10/2013 | Mills | ................. | G06F 16/24568 702/188 |
| 2018/0234706 A1* | 8/2018 | Boussemart | ........ | H04L 12/2881 |
| 2019/0019399 A1* | 1/2019 | Landwehr | ............ | G08B 25/001 |

* cited by examiner

*Primary Examiner* — Loc Tran
(74) *Attorney, Agent, or Firm* — IP Spring (57) ABSTRACT

Implementations described herein relate to methods, systems, and computer-readable media to automatically compute features from a data stream. In some implementations, a method includes receiving a data stream comprising a plurality of data fields. The method further includes storing at least three copies of data in the data stream in a database, wherein each copy is stored on a corresponding hardware storage device. The method further includes performing, one or more rollup operations on a first copy of the data to compute one or more aggregate features and storing the one or more aggregate features on each of the hardware storage devices. The method further includes receiving a request for a particular aggregate feature and providing the particular aggregate feature in response to the request.

19 Claims, 3 Drawing Sheets

AUTOMATIC COMPUTATION OF FEATURES FROM A DATA STREAM

RELATED APPLICATIONS

This application claims the benefit of priority to U.S. Provisional Application No. 62/869,543 filed Jul. 1, 2019, which is incorporated herein by reference in its entirety.

BACKGROUND

Many analytics applications perform data analytics to draw inferences, provide business intelligence, e.g., via real-time dashboards, periodic reports, etc., or automatically trigger actions, e.g., restocking items, triggering service requests, etc. Analytics applications can utilize features derived from input data to perform such analytics. For example, some analytics applications include machine learning models that take as input features computed from the data.

Analytics applications often require experimenting with the features of data, e.g., to determine the features that drive the inferences or that underlie actions to be triggered. In many cases, the features include aggregates, metrics, or rollups computed from transactional data. For example, a stock market analytics application may utilize the average price of a stock grouped by the stock exchange as an input feature, computed from individual stock trades that take place on different exchanges. In another example, an energy analytics application may utilize average temperature grouped by city and state, etc. where the input data is from a large number of temperature sensors.

Analytics applications are also utilized to obtain business intelligence. Different business functions, e.g. marketing, finance, operations, etc., often view the same data with different dimensions, time-scales, etc.

Data that is analyzed by such applications are generated from various transactional applications, e.g., stock market trades, e-commerce transactions, web clickstream data, data from Internet-of-Things (IoT) sensors, etc. The schema of such data can change as the transactional application is updated. Such changes in schema, as well as changes in business intelligence needs (e.g., the frequency of aggregation, the dimensions along which data is aggregated to compute features, etc.), require changes to the analytics application. Such changes e.g., to update the schema in a production environment that receives transactional data on an ongoing basis, or to modify feature computation code of the analytics application, can require significant development or testing effort.

Further, once such updates are made, computing the features retroactively for historically ingested data, while sustaining intake of current data can require significant resources and careful planning, e.g., to run retroactive population only during off-peak hours, when the incoming transactional data is of low volume.

Implementations described herein were conceived in the context of these problems, among other things.

SUMMARY

Implementations described herein relate to methods, systems, and computer-readable media to automatically compute features from a data stream. In some implementations, a computer-implemented method includes receiving a data stream comprising a plurality of data fields and storing at least three copies of data in the data stream in a database, wherein each copy is stored on a corresponding hardware storage device. The method may further include performing one or more rollup operations on a first copy of the data to compute one or more aggregate features and storing the one or more aggregate features on each of the hardware storage devices. The method may further include receiving a request for a particular aggregate feature and providing, in response to the request, the particular aggregate feature.

In some implementations, receiving the data stream may be performed by an ingestion server that comprises a plurality of servers in a cluster. In some implementations, the number of the plurality of servers is based on a size of the data stream, such that the storing is completed within a storage threshold time from receipt of the data stream.

In some implementations, the one or more rollup operations are performed by a rollup server such that the one or more aggregate features are computed within a rollup threshold time from receipt of the data stream.

In some implementations, the method further includes receiving a configuration change indicative of an additional aggregate feature and in response to the configuration change, performing an additional rollup operation on the first copy of the data to compute the additional aggregate feature. In some implementations, performing the additional rollup operation may include performing, with a first priority, the additional rollup operation on incoming data in the data stream and performing, with a second priority less than the first priority, the additional rollup operation on data that was previously stored. In some implementations, the additional rollup operation with the first priority may be performed such that the additional aggregate feature is computed within the rollup threshold time from receipt of the incoming data in the data stream.

In some implementations, the method may further include generating a user interface based on the particular aggregate feature, in response to the request. In some implementations, the operations receiving a request, providing the particular aggregate feature, and generating the user interface may be performed by an analytics server.

In some implementations, the data stream may include a plurality of records that each include respective values for the plurality of data fields. In some implementations, the ingestion server may include a plurality of servers in a cluster. In some implementations, the number of the plurality of servers may be based on a record size of the plurality of records of the data stream.

In some implementations, the database may store the data as one or more binary large objects. In some implementations, the database may have a database schema that corresponds to the plurality of data fields. In some implementations, the method may include receiving an updated data stream that includes an additional field not in the plurality of data fields and updating the database schema based on the additional field. In these implementations, storing at least three copies of data further includes storing the additional field.

In some implementations, the method may further include receiving an updated data stream that excludes a particular field of the plurality of data fields and in response to receiving the updated data stream that excludes the particular field, storing a default value for the particular field in the database for each record in the updated data stream.

In some implementations, the method may further include receiving an updated data stream that excludes a particular field of the plurality of data fields and in response to receiving the updated data stream that excludes the particular field, rejecting the updated data stream such that records from the updated data stream are not stored in the database.

In some implementations, the method may further include deriving the database schema from the data stream.

In some implementations, the hardware storage devices may be configured such that at least a first hardware storage device is controlled by the ingestion server, at least a second hardware storage device is controlled by the rollup server, and at least a third hardware storage device is controlled by the analytics server, wherein the first, second, and third hardware storage devices are distinct storage devices.

In some implementations, the method may further include detecting that at least one of the ingestion server, the rollup server, or the analytics server has failed or has excess workload. The method may further include, in response to the detecting, reconfiguring one or more of the remaining servers to handle workload that was handled by the server that failed. In some implementations, the reconfiguring may include enabling one or more available servers to control hardware storage devices that were controlled by the server that failed.

Some implementations include a non-transitory computer-readable medium with instructions stored thereon that, when executed by a hardware processor, cause the processor to perform operations that include receiving a data stream comprising a plurality of data fields and storing at least three copies of data in the data stream in a database, wherein each copy is stored on a corresponding hardware storage device. The operations may further include performing one or more rollup operations on a first copy of the data to compute one or more aggregate features and storing the one or more aggregate features on each of the hardware storage devices. The operations may further include receiving a request for a particular aggregate feature and in response to the request, providing the particular aggregate feature.

In some implementations, the operations may further include receiving a configuration change indicative of an additional aggregate feature and in response to the configuration change, performing an additional rollup operation on the first copy of the data to compute the additional aggregate feature.

In some implementations, the database may have a database schema that corresponds to the plurality of data fields, and the operations may further include receiving an updated data stream that includes an additional field not in the plurality of data fields and updating the database schema based on the additional field, wherein storing at least three copies of data further includes storing the additional field.

Some implementations include a computing device that include a hardware processor and a memory coupled to the hardware processor, with instructions stored thereon that, when executed by the hardware processor, cause the processor to perform operations that include receiving a data stream comprising a plurality of data fields and storing at least three copies of data in the data stream in a database, wherein each copy is stored on a corresponding hardware storage device. The operations may further include performing one or more rollup operations on a first copy of the data to compute one or more aggregate features and storing the one or more aggregate features on each of the hardware storage devices. The operations may further include receiving a request for a particular aggregate feature and in response to the request, providing the particular aggregate feature.

DETAILED DESCRIPTION

Some implementations described herein provide a mechanism to ingest data from a data stream and store the data in a resilient manner. Some implementations enable atomic updates to a data schema when an input data stream changes. Such updates can be made while data is being ingested, without the use of locks. In some implementations, data ingestion for a data stream is completed within an ingestion threshold time, e.g., within a predefined time limit from the time that the data is received.

Some implementations described herein can perform periodic aggregations (rollup operations) on data ingested from a data stream. The rollup operations may include computation of one or more aggregate features based on the data. In some implementations, the computation of aggregate features is performed within a rollup threshold time, e.g., a predetermined time period from the time that the data is received. Some implementations separate computation of aggregate features from data ingestion, e.g., such that data stream ingestion is unaffected by rollup operations being performed simultaneously.

Some implementations enable a configuration change to be made, e.g., to define additional aggregate features. In response to configuration changes, some implementations include computation of the additional aggregate features for data that was previously ingested. Priorities are assigned such that the computation of aggregate features for data that was previously ingested (historical data) is performed such that computation of aggregate features for incoming data in the data stream is not affected.

Some implementations automatically provide additional servers (e.g., for ingestion, rollup, or analytics) in response to a change in the size of the data stream, change in aggregate features, or requests from data customers. In some implementations, separate hardware data storage devices that store copies of the ingested data and the aggregate features may be controlled by an ingestion server, a rollup server, and an analytics server, such that a change in load of any of the servers does not affect the performance of other servers. In some implementations, in the event of failure of one or more data storage devices, the remainder of data storage devices can be automatically reconfigured to enable access by other servers. In some implementations, alerts may be provided to users when an incoming data stream changes, when data is rejected or discarded when server capacity is reached, etc.

In some implementations, the ingestion server, rollup server, and analytics server may each be implemented as separate hardware servers. In some implementations, two or more of the ingestion server, rollup server, and analytics server may be implemented on the same hardware server, e.g., as separate threads, or processes. In some implementations, one or more of the ingestion server, rollup server, and analytics server may be implemented as a virtual machine or container.

In some implementations, the ingestion server, rollup server, and analytics server may each be independently scalable, such that more ingestion, rollup, or analytics capacity can be added or reduced, independent of capacity of the other servers. For example, scalability may be achieved by implementing any of the servers as a cluster, and adding servers to the respective cluster and/or removing servers from the respective cluster, based on the workload. In some implementations, the clusters may include virtual machines or containers.

The described implementations may be advantageous for business intelligence and machine learning workloads that require flexible access to data streams in real time. For example, computation and storing aggregate features can enable data scientists to view and analyze transaction data interactively. In another example, automatic actions can be defined and triggered based on aggregate features.

Figure 1:
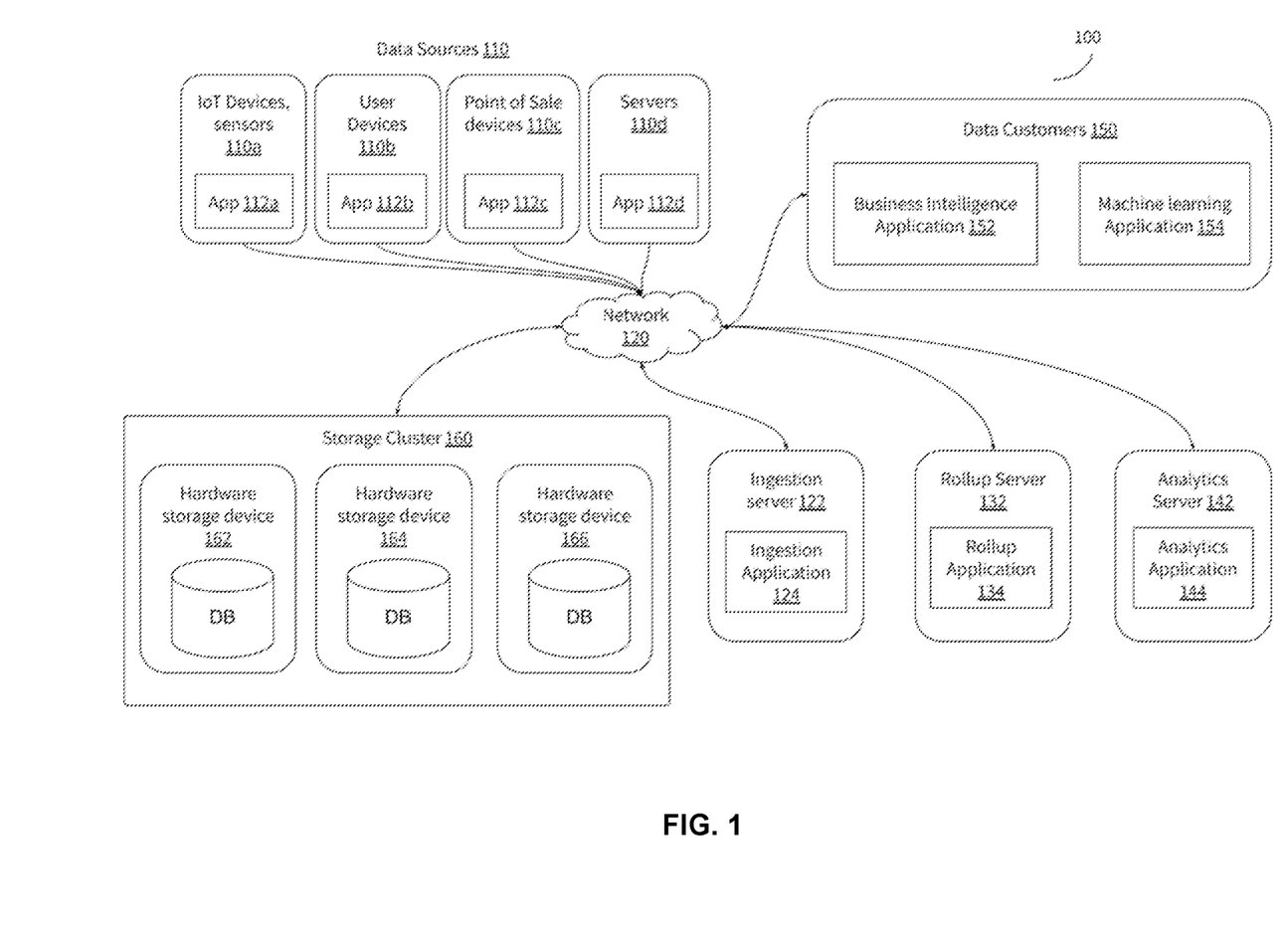
FIG. 1 is a block diagram of an example network environment which may be used for one or more implementations described herein.

FIG. 1 illustrates a block diagram of an example network environment 100, which may be used in some implementations described herein. Environment 100 includes data sources 110, ingestion server 122, rollup server 132, analytics server 142, data customers 150, and storage cluster 160, all coupled via network 120. While one block each of servers 122, 132, 142, any of these blocks can be implemented as multiple blocks, e.g., multiple servers that perform similar functions.

Environment 100 may include one or more devices that act as sources of data. Data sources 110 may include, for example, Internet-of-Things devices or sensors 110a, user devices 110b (e.g., mobile phones, tablets, laptops, wearable devices, personal health devices, fitness trackers, etc.), point of sale devices 110c (e.g., in-store point of sale terminals), servers 110d (e.g., web servers that provide data such as clicks on particular web pages, e-commerce servers that provide transactional data, financial servers that provide banking, stock market and other financial data), etc. Devices 110a-110d are collectively referred to as data sources 110 henceforth.

Each of the data sources 110 may be configured with a corresponding application 112. For example, IoT devices/sensors 110a may include app 112a, User devices 110b may include app 112b, PoS devices 110c may include app 112c, and servers 110d may include app 112d. Applications 112 may provide functionality for data generated by a data source 110 to be sent to a distributed database for storage. Applications 112 may also provide other functionality. In some implementations, an application 112 may include an application component, e.g., a library, provided by a third-party other than a developer of application 112. For example, the application component may be provided by a cloud computing vendor that provides data storage and/or analytics services. For example, the application component may be part of a software development kit (SDK) provided by the cloud computing vendor. Data sources 110 may be coupled to network 120.

In some implementations, data sources 110 may be configured to send data via network 120. For example, such data may include sensor readings from sensor 110a, data obtained by user device 110b such as location information, user activity information (e.g., heart rate, websites visited, etc.), sales data from PoS device 110c (e.g., transaction records, payment method used for a transaction, SKUs of items purchased, etc.), or data from servers 110d (e.g., click data from a web server, logs from a firewall, purchase data from an e-commerce server, data from cameras or image sensors including image metadata such as timestamps, location, etc., radar/LIDAR data, etc.). Data sources 110 can utilize an application 112 to send data to ingestion server 122 via network 130. Data sources 110 may send data over network 120, e.g., as a data stream.

A data stream may include one or more data records. Each data record may have one or more data fields. For example, a data source 110 may generate data records from transactional activity, e.g., a periodic temperature reading obtained by a sensor, an order being recorded by a PoS device or e-commerce server, a user logging in or out of online service, etc. The records may include timestamps and may be provided as a data stream that is updated whenever a transaction event occurs, when a certain number (e.g., 10) of transaction events occur, periodically (e.g., once a minute), or a combination of any of these. Thus, a data stream, as recited herein, may be a flow of data from data sources 110.

Environment 100 may further include data customers 150. For example, data customer 150 may include computing devices, e.g., reporting and analytics servers, that analyze data stored on storage cluster 160. Reporting and analytics servers may execute software that analyzes data, including machine-learning algorithms, applications that include business logic to perform one or more actions based on the data, software utilized by data scientists to perform ad-hoc data analyses, etc. In some implementations, data customers 150 may be configured with a business intelligence application 152 and/or machine learning application 154. In some implementations, applications 152 and/or 154 may provide a user interface. The interface may include reports, e.g., interactive reports, or dashboards, generated from data stored in storage cluster 160, e.g., by applications 152 and/or 154 sending requests for data to the analytics server 142.

Environment 100 may further include an ingestion server 122 that includes an ingestion application 122. While a single server is shown in FIG. 1, different implementations may include a plurality of servers, e.g., arranged in a cluster, that together provide ingestion functionality. Ingestion server 122 may be configured in communication with storage cluster 160 and may write data to hardware storage devices in storage cluster 160. In some implementations, ingestion server 122 may write three copies of data received as a data stream from data sources 110 to storage cluster 160, e.g., one copy each to hardware storage devices 162, 164, and 166.

Environment 100 may further include a rollup server 132 that includes a rollup application 122. While a single server is shown in FIG. 1, different implementations may include a plurality of servers, e.g., arranged in a cluster, that together provide rollup functionality. Rollup server 132 may be configured in communication with storage cluster 160 and may read data from or write data to hardware storage devices in storage cluster 160. In some implementations, rollup server may compute one or more aggregate features from data in the data stream (as stored in the hardware storage devices) and store the computed aggregate features to the hardware storage devices. For example, the rollup server may perform a "group by" operation on transactional data obtained in the data stream, e.g., to obtain a sum total, or count, of one or more data fields in the data stream. For example, aggregate features for a stock may include a total volume of the stock traded within a particular time period, e.g., "100,000 shares sold," and an average of the trading price, e.g., "$11.21." Complex aggregate features that are based on multiple data fields can also be computed as aggregate features, e.g., "what proportion of customers in California that viewed an item added it to a shopping cart?" etc.

In some implementations, such features may be defined by human data analysts, or be set up automatically, e.g., for viewing as a dashboard or interactive report. In some implementations, aggregate features may serve as inputs to a machine learning application. In some such implementations, the aggregate features may not be human readable, but rather be features that can serve as inputs to the machine learning application, e.g., vectors in multidimensional space, that are computed using stored data.

Environment 100 may further include an analytics server 142 that includes an analytics rollup application 144. While a single server is shown in FIG. 1, different implementations may include a plurality of servers, e.g., arranged in a cluster, that together provide analytics functionality. Analytics server 142 may be configured in communication with storage cluster 160 and may read data from or write data to hardware storage devices in storage cluster 160.

In some implementations, analytics server 142 may receive requests from a data customer 150 and provide the requested data, e.g., by retrieving data fields or aggregate features, stored in storage cluster 160. In some implementations, analytics server 142 may process the data prior to sending to the data customer. For example, if the data customer request is for "purchase data for item X over the last day," analytics server 142 may retrieve stored aggregate feature "hourly purchase data for item X" for each hour in the previous 24-hour period, and compute the requested value prior to providing to the data customer.

While FIG. 1 illustrates separate ingestion server 122, rollup server 132, and analytics server 142, in some implementations, the servers may be implemented on a same physical server or virtual machine (VM). For example, in these implementations, the respective applications (ingestion application 124, rollup application 134, and analytics application 144) of each of the servers may be implemented as a separate process that executes on the physical server or the virtual machine. In some implementations, each such process may be allocated a certain capacity of the server on which it executes, e.g., such capacity may be reserved for the process. Further, the functionality can also be implemented in a single process as three separate threads, each with its own resource allocation. Stated another way, ingestion application 124, rollup application 134, and analytics application 144 may be implemented as three different workers, as threads of a program, processes, virtual machines/containers, or on dedicated hardware servers. different implementations, different sub-combinations (e.g., ingestion & rollup, rollup & analytics, ingestion & analytics) may be implemented on a same server, with other functionality being implemented on other servers. The word "server," used in context of servers 122, 132, or 142, may be understood as referring to a hardware server, a virtual machine, or a process/thread executing on a hardware server/VM that has been allocated a portion of the server or VM capacity.

Implementing servers 122, 132, and 142 in this manner can provide flexibility in performing these functions. For example, when the data stream from data sources 110 increases in size (e.g., more incoming data per time period), ingestion server 122 may be scaled up (e.g., by adding more ingestion servers, or increasing allocation of machine capacity to ingestion application 124. Similarly, when rollup or analytics workload increases, corresponding capacity can be added. Alternatively, when workload of an individual server falls below a threshold, the corresponding application may be provided a lower allocation of available capacity. In various implementations, such dynamic scaling of capacity can ensure that data streams are ingested, rollups are computed, and analytics are provided within service-levels agreed upon with data sources 110 and/or data customers 150. In some implementations, e.g., when the ingestion, rollup, and analytics applications are to be separated, each application may be implemented on a respective dedicated server.

Environment 100 may further include a storage cluster that includes a plurality of hardware storage devices, e.g., three hardware storage devices (162, 164, 166). In different implementations, any number of hardware storage devices may be provided. The hardware storage devices, e.g., devices 162, 164, and 166 may each store a copy of the data received as a data stream, e.g., from any of data sources 110, in a database (denoted in FIG. 1 as "DB"). Hardware storage devices 162, 164, and 166 are physically distinct storage devices, e.g., such that failure of any of the storage devices does not affect other storage devices. Hardware storage devices may include any type of storage hardware, e.g., dynamic random-access memory (DRAM), 3DXpoint memory, solid-state storage (e.g., flash), hard disk drives, etc. Distributed data storage may provide data resiliency.

In some implementations, one or more elements of environment 100 may be part of a data center (e.g., of a cloud computing provider), and other elements may be outside the data center. For example, as illustrated in FIG. 1, data sources 110 may be outside the data center, e.g., situated at geographic locations distinct from that of the data center. Such elements may be referred to as being outside the perimeter of the data center.

In some implementations, one or more elements may be within a single data center, or multiple data centers, e.g., managed by a cloud computing provider. A trusted perimeter may be defined within the data center or multiple data centers which house elements that are relatively secure and protected from external threats. The security of such elements may arise from their physical location (e.g., low risk of access from hackers, intruders, etc.), the configuration of such elements, or combinations thereof. Such elements may be referred to as being within the trusted perimeter of the data center. The cloud computing provider may control the elements within the trusted perimeter of the data center, e.g., start/stop, reboot, disconnect from the network, etc. while the cloud computing provider does not control elements outside the trusted perimeter.

The environment may also include various elements that lie outside the trusted perimeter. These may include devices (e.g., sensors, computers, etc.) and systems that communicate with elements within the trusted perimeter of the data center, and which may pose a higher security risk within the environment (e.g., sensors that may be stolen and/or reconfigured, third-party hardware and software elements that may be hacked, etc.)

Figure 2:
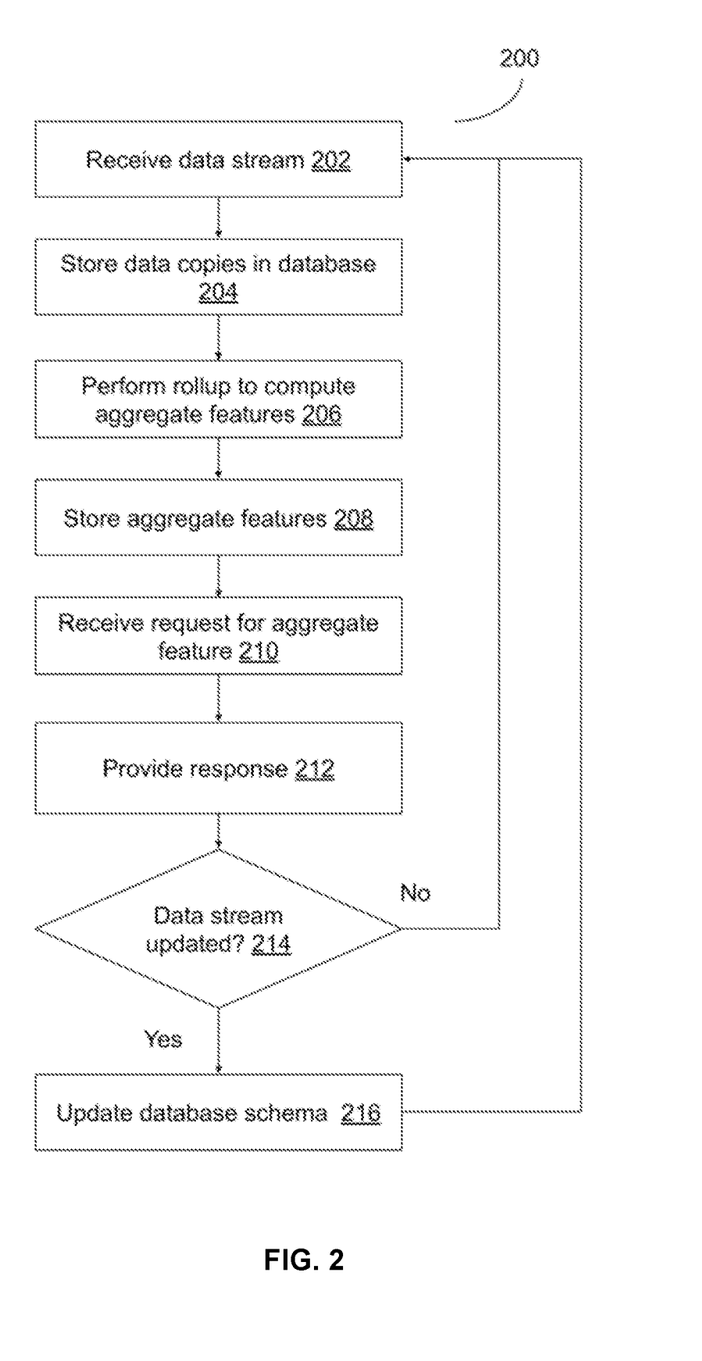
FIG. 2 is a flow diagram illustrating one example of a method, according to some implementations.

FIG. 2 is a flow diagram illustrating one example of a method 200, according to some implementations.

In block 202, a data stream may be received. For example, ingestion server 122 may receive data from any of data sources 110. The data stream may include one or more records, e.g., each corresponding to a transaction. Each record may include a plurality of data fields. For example, a data stream received from a data source of an e-commerce application provider may include records that correspond to customer viewing or purchasing an item. Such records may include fields such as e.g., "Customer ID," "ItemID," "price," "timestamp," "Status," etc. where status may indicate whether the customer viewed the item or purchased the item. For example, if a customer A first views an item and then purchases it, the data stream may include two records, first record corresponding to the view transaction and a second record corresponding to the purchase transaction. Another customer B that views an item but does not purchase may only generate a single record in the data stream. Further, while the foregoing discussion refers to purchase and view activities in a single data stream, in some implementations, purchase and view actions may be different data streams with corresponding attributes.

In some implementations, ingestion server 122 may derive the database schema from the data stream. For example, if a data source 110 sends data in text format, e.g., as comma-separated values, ingestion server 122 may use validation techniques to determine the data types for each field in a data record and may generate a database schema based on the data types and/or observed values. Block 202 may be followed by block 204.

In block 204, copies of the data in the data stream may be stored. In some implementations, ingestion server 122 may send storage commands to hardware storage devices (162, 164, 166) to store the data. In some implementations, at least three copies of data may be stored, e.g., to provide redundancy. The data may be stored in a database that has a schema that corresponds to the plurality of data fields. For example, the database may be a relational database and the schema for the e-commerce transactions referred to above may include the data fields, arranged in one or more tables of the relational database. In some implementations, other types of databases, e.g., NoSQL database, can also be used.

In some implementations, the storage command from ingestion server 122 may cause hardware storage devices (162, 164, 166) to store the data. Each copy may be stored independently and ingestion server 122 may receive a confirmation that the copy was successfully written.

In some implementations, ingestion server 122 may include a plurality of servers in a cluster. The number of servers in the cluster may be based on a size of the data stream that ingestion server 122 receives, e.g., the size of each record, and the number of records received in a particular time period. In some implementations, the number of servers in the cluster may be adjusted dynamically based on the size of the data stream. For example, if a data source 110 increases the rate at which it sends data to ingestion server 122, a higher number of servers may be deployed, and vice versa. In some implementations, each of hardware storage devices (162, 164, 166) may include a plurality of storage devices (e.g., storage disks, storage servers, etc.). The storage capacity of hardware storage devices may be selected based on the size of the data stream.

In some implementations, a retention policy may be associated with data stored in storage cluster 160. For example, the retention policy may specify a time period for which the records from a data stream are to be retained, e.g., one hour, one day, one month, permanently, etc. The storage capacity of hardware storage devices may further be selected based on the retention policy, e.g., ingestion server 122 may be configured to determine the storage capacity based on the retention policy.

Dynamically sizing ingestion server 122 and selecting appropriate storage capacity (and type of storage device) of storage cluster 160 may ensure that storing of data by the ingestion server is completed within a storage threshold time from receipt of the data stream by the ingestion server. For example, the storage threshold time may correspond to a service level agreement, e.g., between a data source 110 or data customer 150, and provider of ingestion server 122. Block 204 may be followed by block 206.

In block 206, one or more rollup operations may be performed on the stored data, e.g., a first copy of the stored data. In some implementations, a rollup server 132 may perform the rollup operations. In some implementations, performing a rollup operation may include computing one or more aggregate features based on stored data. For example, a rollup operation in e-commerce applications may include computing aggregate features such as conversion rate, e.g., defined as "proportion of customers who viewed to customers who purchased an item." Rollup server 132 may perform the operation on stored data. For example, rollup operations may be performed periodically, e.g., once a minute, once an hour, etc., or on-demand, e.g., when a data customer sends a data request for which an aggregate feature was not previously computed.

In some implementations, rollup operations may be performed on new data, e.g., data that was ingested, but for which rollup has not been performed. In some implementations, rollup operations may be performed on historical data. For example, a data customer 150 may make a configuration change to a dashboard that displays (or is based on) an aggregate feature that was not previously computed. For example, in the e-commerce example, a new aggregate feature, "conversion rate within 5 minutes" may be defined as "proportion of customers who viewed to customers who purchased an item within 5 minutes of viewing the item". Such a configuration change may be provided as input to the rollup server. In response to the configuration change, the rollup server may perform rollup operations on the data to compute the additional aggregate feature.

In some implementations, the one or more operations may be performed such that the aggregate features are computed within a rollup threshold time from receipt of the data stream. Rollup server 132 may be a cluster that includes a plurality of servers. The number of servers may be determined based on a size of ingested data and the computational load to complete rollup operations within the rollup threshold time. Ensuring such completion can be valuable, e.g., when a data customer 150 views the aggregate feature in a dashboard. For example, if data customer 150 views the "conversion rate within 5 minutes" aggregate feature on a dashboard, which triggers a data request to storage cluster 160, ensuring that the aggregate feature computation is performed in less than 5 minutes from receipt of the data stream can ensure that the value of the aggregate feature as displayed in the dashboard is up-to-date, e.g., accurate for time periods up to 5 minutes before the time of receipt of the request.

In some implementations, rollup server 132 may opportunistically perform the computation of new aggregate features for historical data, e.g., when compute capacity is available and rollup operations for the received data in the data stream have been completed. In some implementations, when additional rollup operations are triggered, e.g., due to a configuration change, a first priority may be assigned to additional rollup operations for incoming data in the data stream and a second priority may be assigned to additional rollup operations for historical data, e.g., data for which rollup operations were previously completed. In some implementations, the first priority may be greater than the second priority. In some implementations, the additional rollup operation with the first priority may be performed such that the additional aggregate feature is computed within the rollup threshold time from receipt of incoming data in the data stream. Block 206 may be followed by block 208.

In some implementations, rollup server 132 may receive a command (e.g., from a data customer) to delete one or more previously computed rollups, e.g., when such rollups are no longer in use for analytics or other purposes. Subsequently, rollup server 132 may receive another command to compute the same rollup that was previously requested to be deleted, e.g., from the same data customer or another data customer. In such a situation, if the rollup was deleted, rollup server 132 may need to perform a rollup for such data again leading to additional computation costs for such retroactive rollups.

In some implementations, to avoid such duplicative computation, rollups for which deletion commands are received are marked for deletion, but not actually deleted from storage (e.g., from storage cluster 160). However, further computation of the rollup is stopped based on receipt of the deletion command, thus not computing rollups that are no longer in use.

At a later time, when a rollup marked for deletion is requested again, the rollup is restored (e.g., by removing the mark for deletion). For example, if a previously performed rollup marked for deletion includes data for a time period t1 through t2, and the rollup is restarted at a later time t3, the rollup for the time period t1-t2 is restored, and a fill-up operation (e.g., as described above with reference to rollups for historical data) is performed to compute rollup for the time period t2-t3. The fill-up operation can be used to update the stored data for the rollup. Rollups are automatically computed for periods after t3.

In block 208, the computed aggregate features may be stored. For example, rollup server 132 may generate storage commands for hardware storage devices (162, 164, 166) to store the computed aggregate features. Multiple copies of the aggregate features may be stored to provide redundancy. Block 208 may be followed by block 210.

In block 210, a request may be received for one or more particular aggregate features. For example, the request may be received from one or more of data customers 150. In some implementations, an analytics server 142 may receive the request. In some implementations, analytics server 142 may generate a user interface based on the particular aggregate feature. For example, analytics server 142 may generate a conversion rate illustration, that can be displayed. Conversion rate illustration may be generated based on the computed aggregate feature. Further, analytics server 142 may perform additional grouping or other operations based on the request. For example, if a data customer requests conversion rate by day for the last week, and the stored aggregate feature is "conversion rate by hour," analytics server 142 may perform a further grouping operation. In some implementations, such operations may include combining multiple aggregate features. Block 210 may be followed by block 212.

In block 212, a response to the request is provided. For example, analytics server 142 may provide the particular aggregate feature that was requested, e.g., as a data record, in a user interface, etc. Block 212 may be followed by block 214.

In block 214, it is determined if the data stream was updated. For example, a data stream may be updated if one or more additional fields that is not in the plurality of data fields previously received is added, if a particular field is excluded, etc. If it is determined in block 214 that the data stream was updated, block 214 may be followed by block 216. If it is determined in block 214 that the data stream was not updated, block 214 may be followed by block 202 to continue to receive the data stream, e.g., to receive further records in the data stream.

In block 216, the database schema is updated based on the updated data stream. For example, if the updated data stream includes an additional data field, the additional field is added to the database schema. In another example, if a particular field is excluded from the updated data stream, ingestion server 122 may automatically store a default value for the particular field that was excluded. In some implementations, the default value may be a null value. In some implementations, when the updated data stream excludes the particular field, the ingestion server may reject the updated data stream. In these implementations, records from the updated data stream are not stored in the database. In some implementations, exclusion of a particular field may trigger ingestion server 122 generating and displaying a user interface that includes a warning message, e.g., that indicates that the particular field was excluded from the updated data stream. Block 216 may be followed by block 202 to receive the data stream, e.g., to receive additional records in the data stream, to receive an updated data stream, etc.

In various implementations, each server may be assigned a role, e.g., be designated as responsible for a particular type of workload. For example, ingestion server 122 may perform ingestion operations, e.g., receiving the data stream and writing copies of data in the data stream to hardware storage devices.

In some implementations, ingestion server 122 may also perform a limited amount (e.g., 5% of the total workload of the ingestion server) of data extraction, e.g., for MicroServices. For example, in some implementations, MicroServices may include recommendation engines, e.g., on e-commerce websites, video hosting websites, media websites, etc. In many applications, recommendations based on recent user activity (e.g., purchases, clicking a link, viewing a video, etc.) are utilized when performing a next action after a transaction, e.g., selecting an advertisement for the target web page when a link is clicked, automatically playing a next video when a video ends, etc. A recommendation engine may therefore need generate recommendations, e.g., for the next video or advertisement, within a short time period after the user activity. In some implementations, recommendation engines or other MicroServices may execute on ingestion server and access the data stream from memory, e.g., DRAM, 3DXpoint, etc. This may be advantageous since such data access can enable the recommendation engine or other MicroService to perform computation immediately upon receipt of the data stream by the ingestion server, e.g., without requiring that the data be written to a hardware storage device.

Rollup server 132 may perform rollup operations, e.g., computing one or more aggregate features and storing copies of the computed features to hardware storage devices. In some implementations, rollup server 132 may receive requests from analytics server 142 or other configuration change inputs to perform one or more additional rollups and may perform additional rollups to serve such requests.

Analytics server 142 may receive requests from data customers, and in response to the requests, may extract the requested aggregate features from the hardware storage devices. In some implementations, analytics server 142 may determine additional rollups to be performed, e.g., if a request from a data customer includes an aggregate feature that was not computed by rollup server 132. In these implementations, analytics server 142 may compute the requested aggregate feature or generate a request to rollup server 132 to perform an additional rollup to generate the aggregate feature. In some implementations, analytics server 142 may also implement a business intelligence or machine learning application, e.g., data customers may deploy such applications on analytics server 142. In some implementations, analytics server 142 may also generate user interfaces (e.g., dashboards, interactive reports, etc.) based on the aggregate features.

In some implementations, hardware storage devices (162, 164, 166) may be configured such that each storage device is controlled by a particular server. For example, in some implementations, storage device 162 may be controlled by ingestion server 122, storage device 164 may be controlled by rollup server 132, and storage device 166 may be controlled by analytics server 142. A storage device that is controlled by a server may prioritize data transfer requests from the server, e.g., storage device 162 may prioritize data transfer operations initiated by ingestion server 122. This may ensure that data writes are completed within an ingestion threshold time, storage device 164 may prioritize data read and write requests generated by rollup operations performed by rollup server 132. This may ensure that roll up operations are completed with a rollup threshold time. In these implementations, storage devices controlled by a particular server may also be accessible by other servers, e.g., to perform writes of copies of data of the data stream, to store aggregate features, to fulfill analytics requests for aggregate features, etc.

In some implementations, method 200 may further include detecting that one or more of ingestion server 122, rollup server 132, or analytics server 142 has failed or is overloaded, e.g., the workload provided to the server exceeds available server capacity. For example, ingestion overload may occur when a size of the data stream increases. In another example, rollup overload may occur when the rollup server receives additional rollup requests that exceed capacity. For example, failure may include a reduction in capacity of the server. In another example, when a server is implemented as a cluster of servers, server failure may include one or more servers in the cluster going down. In some implementations, failure may correspond to hardware failure, e.g., when the servers are physical servers. In some implementations, failure may correspond to software failure, e.g., when the servers are implemented as virtual servers, e.g., virtual machines in a hosting or cloud computing environment. Server failure can also include the server becoming unreachable via network 120. In some implementations, detecting server failure may be based on determining that a particular operation was not completed within a corresponding threshold time, e.g., that ingestion of the data stream was not completed within ingestion threshold time, such that one or more records in the data stream are not written to hardware storage within the ingestion threshold time.

When failure of a server is detected, one or more mitigating actions may be taken. A mitigating action may include launching additional servers and assigning them the role of the server that failed, e.g., ingestion, rollup, or analytics. In some implementations, the additional servers may be virtual machines, e.g., based on preconfigured server images, or containers, that include the corresponding application code to perform the role.

In some implementations, a mitigating action may include (in addition or alternative to launching additional servers), updating the role of one or more other servers. For example, if failure is detected at ingestion server, it may be determined that the available ingestion capacity is lower than a size of the data stream. Further, it may be determined that the rollup server has excess capacity, e.g., completion of rollup operations within the rollup threshold time can be achieved if the capacity of the rollup server is reduced. In this example, one or more servers that functions as a rollup server may be determined to be available and may be reconfigured to function as an ingestion server to handle ingestion workload. In some implementations, reconfiguring a server may include enabling the server to access hardware storage device(s) that were controlled by the server that failed, e.g., ingestion server.

In some implementations, failure of one or more hardware storage devices may occur, e.g., due to error in storage hardware such as solid-state drives. In response to detecting such failure, one or more additional hardware storage devices may be deployed to be controlled by the server that controlled the failed hardware storage devices. Data may then be replicated to the newly deployed hardware storage devices, e.g., from other available hardware storage devices. For example, if storage device 162 fails, data replication may be performed using data stored on hardware storage devices 164 and/or 166. In some implementations, the source for replication may be selected based on the workload of a corresponding server.

Figure 3:
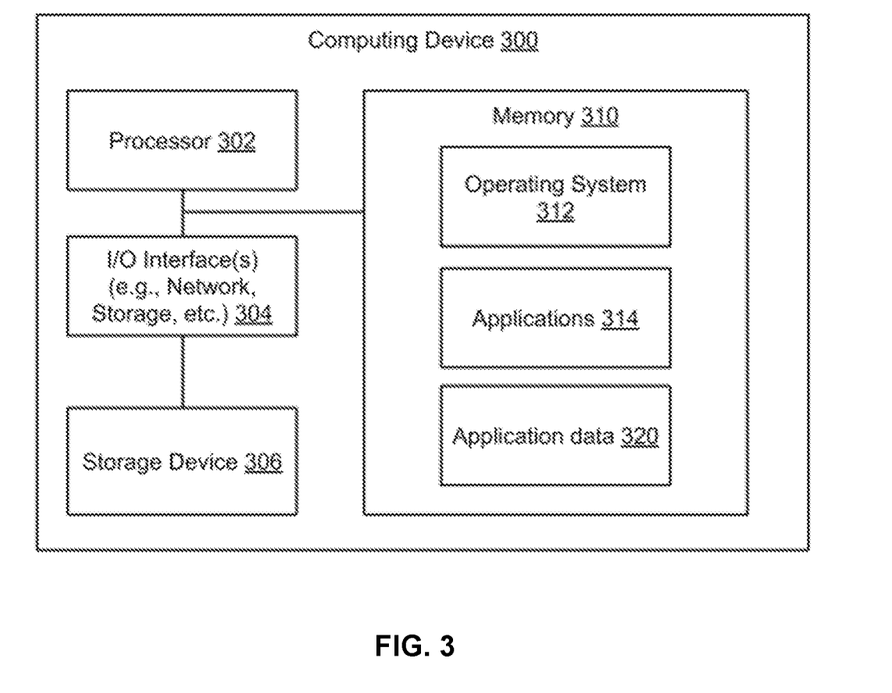
FIG. 3 is a block diagram of an example computing device which may be used to implement one or more features described herein.

FIG. 3 is a block diagram of an example computing device 300 which may be used to implement one or more features described herein. In one example, device 300 may be used to implement a computer device, e.g., a data stream storage, rollup, or analytics device, and perform appropriate method implementations described herein. Device 300 can be any suitable computer system, server, or other electronic or hardware device. For example, the device 300 can be a mainframe computer, server computer, desktop computer, workstation, portable computer, or medical device. In some implementations, device 300 includes a processor 302, input/output (I/O) interface 304, one or more storage devices 306, and a memory 310.

Processor 302 can be one or more processors and/or processing circuits to execute program code and control basic operations of the device 300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 310 is typically provided in device 300 for access by the processor 302 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 302 and/or integrated therewith. Memory 310 can store software operating on the server device 300 by the processor 302, including an operating system 312, one or more applications 314, and application data 320. In some implementations, applications 314 can include instructions that enable processor 302 to perform the functions described herein, e.g., some or all of the method of FIG. 2. Memory 310 also stores application data 320.

For example, applications 314 can include one or more applications that provide the functionality to ingest data, perform data rollup, and serve data analytics, as described with reference to FIG. 2.

Any of software in memory 310 can alternatively be stored on any other suitable storage location or computer-readable medium. In addition, memory 310 (and/or another connected storage device(s)) can store other instructions and data used in the features described herein. Memory 310 and any other type of storage (magnetic disk, optical disk, magnetic tape, or other tangible media) can be considered "storage" or "storage devices."

I/O interface 304 can provide functions to enable interfacing the computing device 300 with other systems and devices. For example, network communication devices, external storage devices, and other input/output devices can communicate via interface 304. In some implementations, the I/O interface 304 can connect to interface devices including input devices (keyboard, pointing device, touchscreen, microphone, camera, scanner, etc.) and/or output devices (display device, speaker devices, printer, motor, etc.).

Device 306 is one example of a storage device, e.g., a solid-state storage device, a hard disk drive, etc. that can be used by operating system 312 and/or one or more applications 314. The storage device 306 is a direct-attached storage device, e.g., coupled to processor 302 and directly controlled by processor 302. Processor 302 is coupled to I/O interface(s) 304, storage device 306, and memory 310 via local connections (e.g., a PCI bus, or another type of local interface) and/or via networked connections.

For ease of illustration, FIG. 3 shows one block for each of processor 302, I/O interface 304, storage device 306, and memory 310 with software blocks 312, 314, and 320. These blocks may represent one or more processors or processing circuitries, operating systems, memories, I/O interfaces, applications, and/or software modules. In other implementations, device 300 may not have all of the components shown and/or may have other elements including other types of elements instead of, or in addition to, those shown herein. Any suitable component or combination of components of system 102 or similar system, or any suitable processor or processors associated with such a system, may perform the operations described, e.g., with reference to FIG. 2.

A user device can also implement and/or be used with features described herein. Example user devices can be computer devices including some similar components as the computing device 300. An operating system, software, and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
receiving, by an ingestion server, a data stream comprising a plurality of data fields;
storing, by the ingestion server, at least three copies of data in the data stream in a database, wherein each copy is stored on a corresponding hardware storage device, wherein the ingestion server comprises a plurality of servers in a cluster, and wherein a number of the plurality of servers is based on a size of the data stream, such that the storing is completed within a storage threshold time from receipt of the data stream;
performing, by a rollup server, one or more rollup operations on a first copy of the data to compute one or more aggregate features;
storing, by the rollup server, the one or more aggregate features on each of the hardware storage devices;
receiving, by an analytics server, a request for a particular aggregate feature; and
providing, by the analytics server and in response to the request, the particular aggregate feature.

2. The computer-implemented method of claim 1, wherein the one or more rollup operations are performed such that the one or more aggregate features are computed within a rollup threshold time from receipt of the data stream.

3. The computer-implemented method of claim 1, further comprising:
receiving, by the analytics server, a configuration change indicative of an additional aggregate feature; and
in response to the configuration change, performing, by the rollup server, an additional rollup operation on the first copy of the data to compute the additional aggregate feature.

4. The computer-implemented method of claim 3, wherein performing the additional rollup operation comprises:
performing, with a first priority, the additional rollup operation on incoming data in the data stream; and
performing, with a second priority less than the first priority, the additional rollup operation on data that was previously stored.

5. The computer-implemented method of claim 4, wherein the additional rollup operation with the first priority is performed such that the additional aggregate feature is computed within a rollup threshold time from receipt of the incoming data in the data stream.

6. The computer-implemented method of claim 1, further comprising:
generating, by the analytics server, a user interface based on the particular aggregate feature, in response to the request.

7. The computer-implemented method of claim 1, wherein the data stream comprises a plurality of records that each include respective values for the plurality of data fields, and wherein the number of the plurality of servers is further based on a record size of the plurality of records of the data stream.

8. The computer-implemented method of claim 1, wherein the database stores the data as one or more binary large objects.

9. The computer-implemented method of claim 1, wherein the database has a database schema that corresponds to the plurality of data fields.

10. The computer-implemented method of claim 9, further comprising:
receiving, by the ingestion server, an updated data stream that includes an additional field not in the plurality of data fields; and
updating, by the ingestion server, the database schema based on the additional field, wherein storing at least three copies of data further includes storing the additional field.

11. The computer-implemented method of claim 9, further comprising:
receiving, by the ingestion server, an updated data stream that excludes a particular field of the plurality of data fields; and
in response to receiving the updated data stream that excludes the particular field, storing a default value for the particular field in the database for each record in the updated data stream.

12. The computer-implemented method of claim 9, further comprising:
receiving, by the ingestion server, an updated data stream that excludes a particular field of the plurality of data fields; and
in response to receiving the updated data stream that excludes the particular field, rejecting the updated data stream such that records from the updated data stream are not stored in the database.

13. The computer-implemented method of claim 9, further comprising deriving the database schema from the data stream.

14. The computer-implemented method of claim 1, wherein the hardware storage devices are configured such that at least a first hardware storage device is controlled by the ingestion server, at least a second hardware storage device is controlled by the rollup server, and at least a third hardware storage device is controlled by the analytics server, wherein the first, second, and third hardware storage devices are distinct storage devices.

15. The computer-implemented method of claim 1, further comprising:
detecting that at least one of the ingestion server, the rollup server, or the analytics server has failed or has excess workload; and
in response to the detecting, reconfiguring one or more of the remaining servers to handle workload that was handled by the server that failed, wherein the reconfiguring includes enabling one or more available servers to control hardware storage devices that were controlled by the server that failed.

16. A non-transitory computer-readable medium with instructions stored thereon that, when executed by a hardware processor, cause the processor to perform operations comprising:
receiving a data stream comprising a plurality of data fields;
storing, by an ingestion server, at least three copies of data in the data stream in a database, wherein each copy is stored on a corresponding hardware storage device, wherein the ingestion server comprises a plurality of servers in a cluster, and wherein a number of the plurality of servers is based on a size of the data stream, such that the storing is completed within a storage threshold time from receipt of the data stream;
performing one or more rollup operations on a first copy of the data to compute one or more aggregate features;
storing the one or more aggregate features on each of the hardware storage devices;
receiving a request for a particular aggregate feature; and
in response to the request, providing the particular aggregate feature.

17. The non-transitory computer-readable medium of claim 16, wherein the operations further comprise:
receiving a configuration change indicative of an additional aggregate feature; and
in response to the configuration change, performing an additional rollup operation on the first copy of the data to compute the additional aggregate feature.

18. The non-transitory computer-readable medium of claim 16, wherein the database has a database schema that corresponds to the plurality of data fields, and wherein the operations further comprise:
receiving an updated data stream that includes an additional field not in the plurality of data fields; and
updating the database schema based on the additional field, wherein storing at least three copies of data further includes storing the additional field.

19. A computing device comprising:
a hardware processor; and
a memory coupled to the hardware processor, with instructions stored thereon that, when executed by the hardware processor, cause the processor to perform operations comprising:
receiving a data stream comprising a plurality of data fields;
storing, by an ingestion server, at least three copies of data in the data stream in a database, wherein each copy is stored on a corresponding hardware storage device, wherein the ingestion server comprises a plurality of servers in a cluster, and wherein a number of the plurality of servers is based on a size of the data stream, such that the storing is completed within a storage threshold time from receipt of the data stream;

performing one or more rollup operations on a first copy of the data to compute one or more aggregate features;

storing the one or more aggregate features on each of the hardware storage devices;

receiving a request for a particular aggregate feature; and in response to the request, providing the particular aggregate feature.

\* \* \* \* \*